F. CHATFIELD.
SCALE.
APPLICATION FILED MAR. 7, 1910.

1,034,202.

Patented July 30, 1912.

4 SHEETS—SHEET 1.

WITNESSES

INVENTOR
FRANKLIN CHATFIELD
BY Paul & Paul
ATTORNEYS

F. CHATFIELD.
SCALE.
APPLICATION FILED MAR. 7, 1910.

1,034,202.

Patented July 30, 1912.
4 SHEETS—SHEET 2.

WITNESSES

INVENTOR
FRANKLIN CHATFIELD
BY Paul & Paul
ATTORNEYS

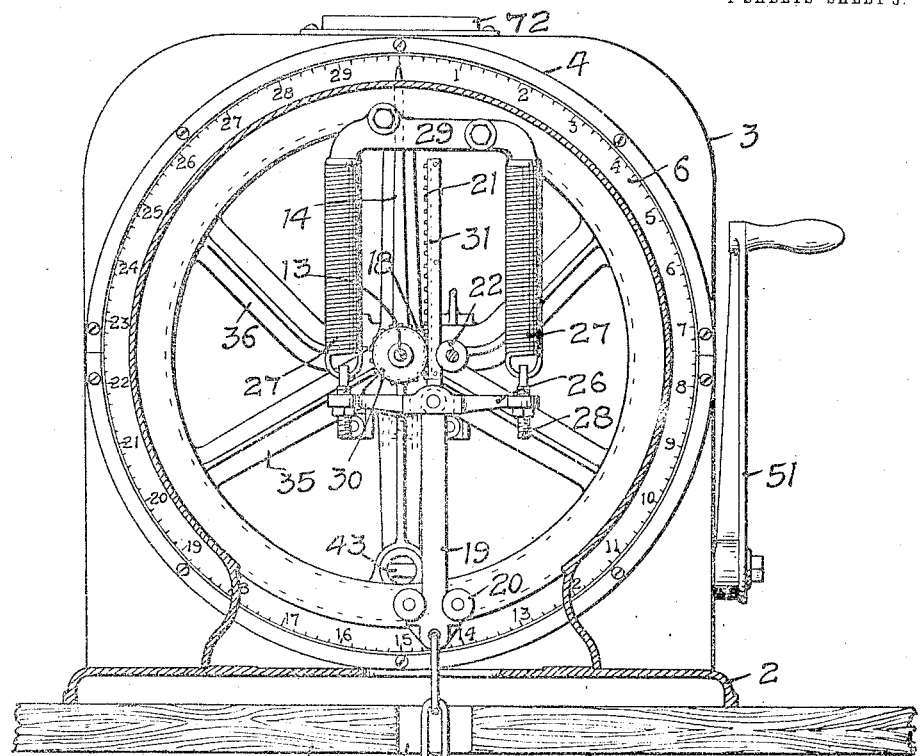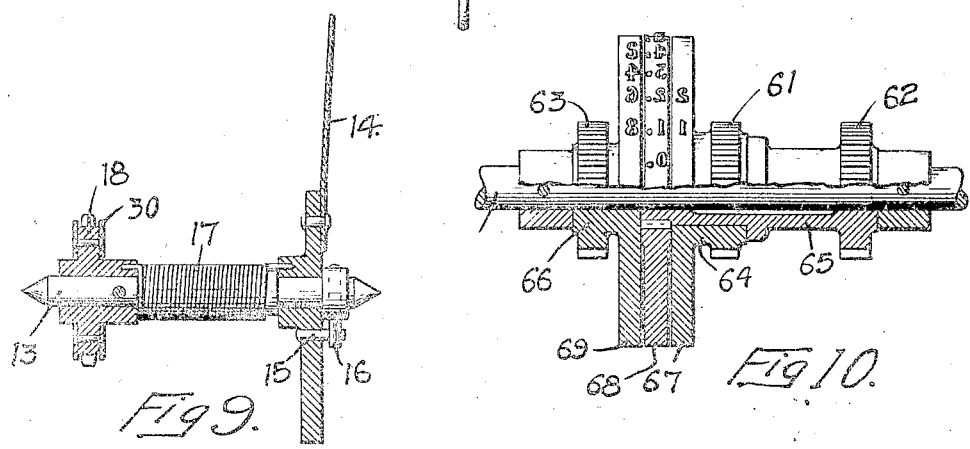

F. CHATFIELD.
SCALE.
APPLICATION FILED MAR. 7, 1910.

1,034,202.

Patented July 30, 1912.

4 SHEETS—SHEET 4.

Y-Y

WITNESSES

INVENTOR
FRANKLIN CHATFIELD
BY Paul & Paul
ATTORNEYS

UNITED STATES PATENT OFFICE.

FRANKLIN CHATFIELD, OF MINNEAPOLIS, MINNESOTA.

SCALE.

1,034,202.  Specification of Letters Patent.  Patented July 30, 1912.

Application filed March 7, 1910. Serial No. 547,728.

*To all whom it may concern:*

Be it known that I, FRANKLIN CHATFIELD, of Minneapolis, Hennepin county, Minnesota, have invented certain new and useful Improvements in Scales, of which the following is a specification.

The object of my invention is to provide a scale of simple, economical construction by means of which the weight of a package may be indicated on a dial and almost simultaneously impressed upon a card or ticket.

A further object is to provide a scale in which the movement of the mechanism controlling the printing wheels will be positively controlled by the position of the indicator hand on the dial, thus insuring the correspondence of the figures on the card or ticket with the weight designated by the indicator hand.

A further object is to provide a scale mechanism which will be rapid in its operation and capable of marking on a ticket the weight in pounds and fractions thereof.

Other objects of the invention will appear from the following detailed description.

The invention consists generally in an indicator hand and dial therefor, a printing mechanism, and means controlled by the position of the indicator hand for regulating the movement of the printing mechanism.

Further the invention consists in various constructions and combinations, all as hereinafter described and particularly pointed out in the claims.

Figure 1:
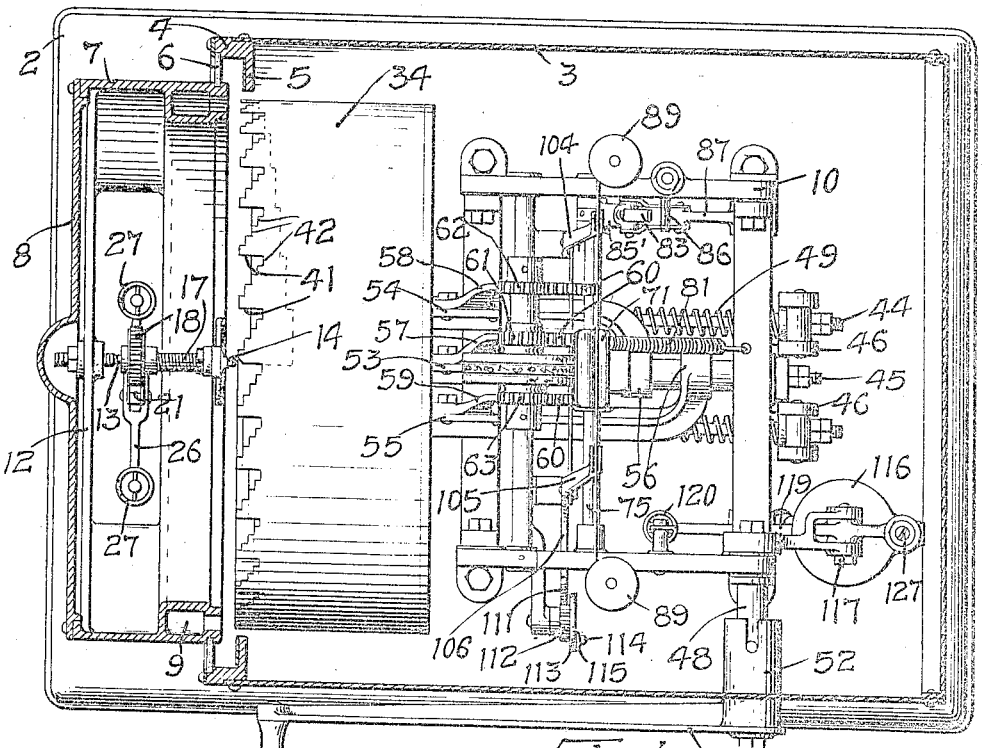
Figures 6, 7, 8:
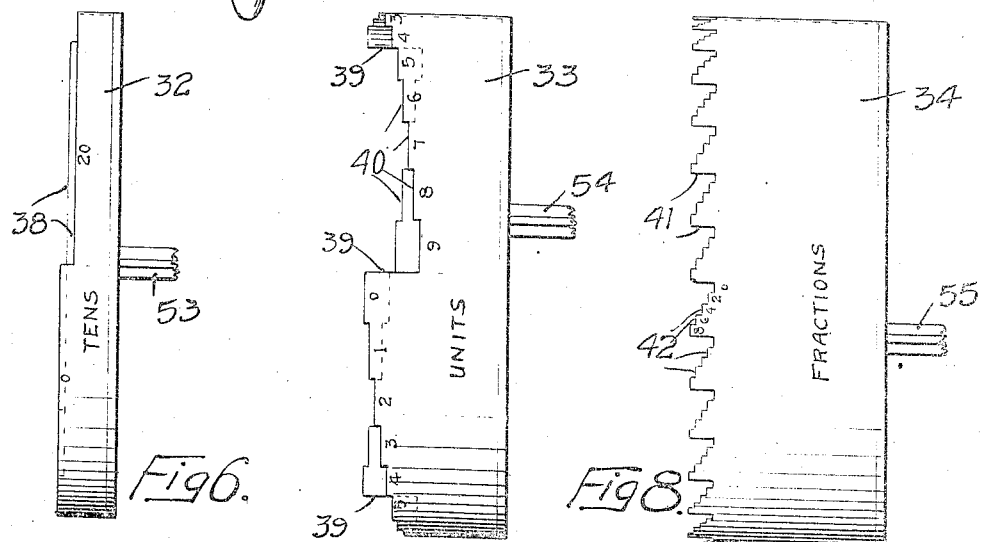
Figure 2:
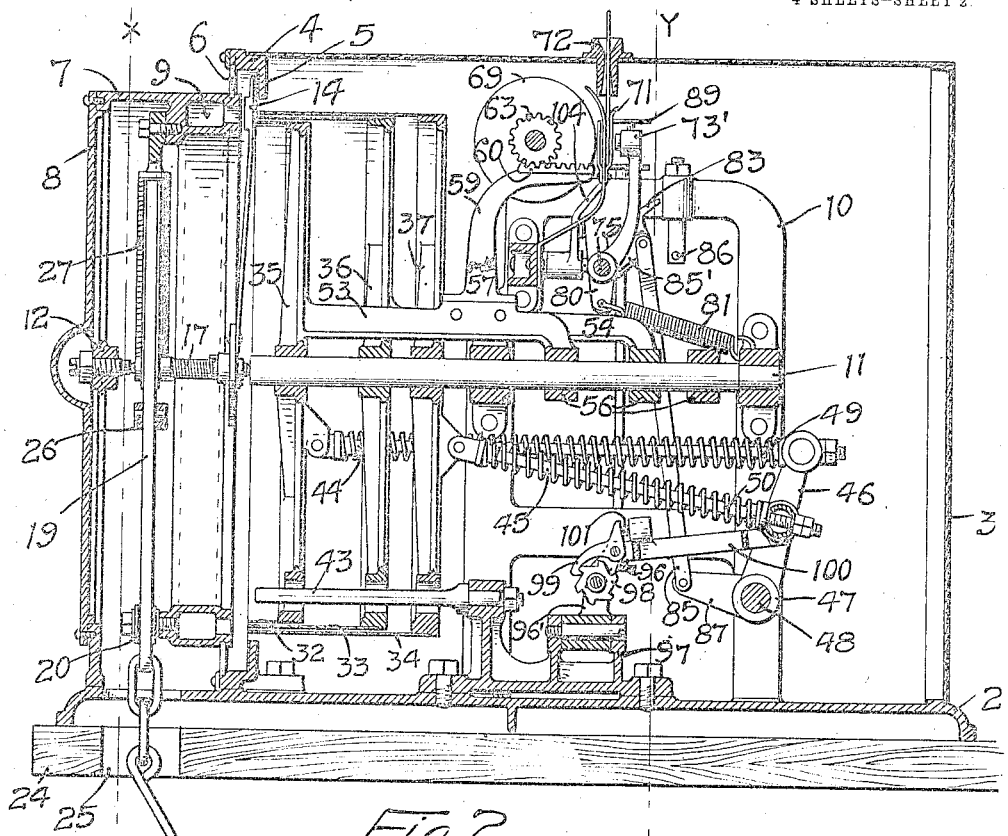
Figure 12:
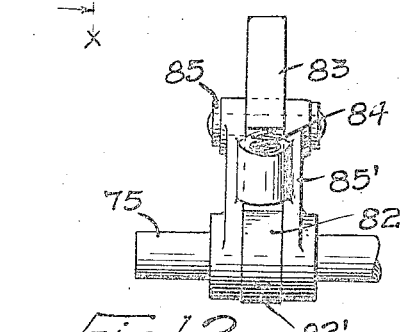
Figure 11:
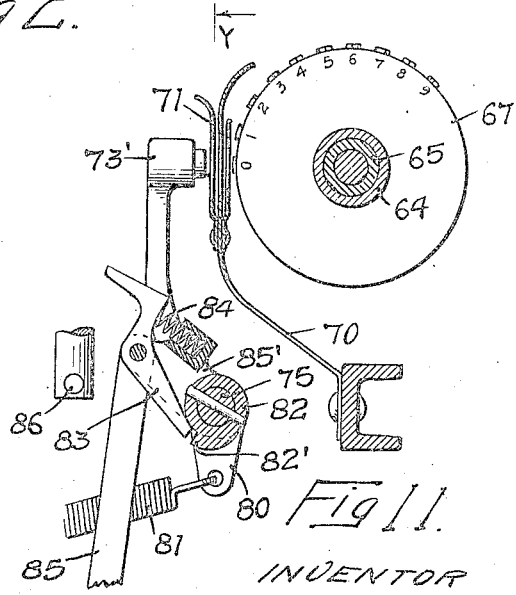
Figure 4:
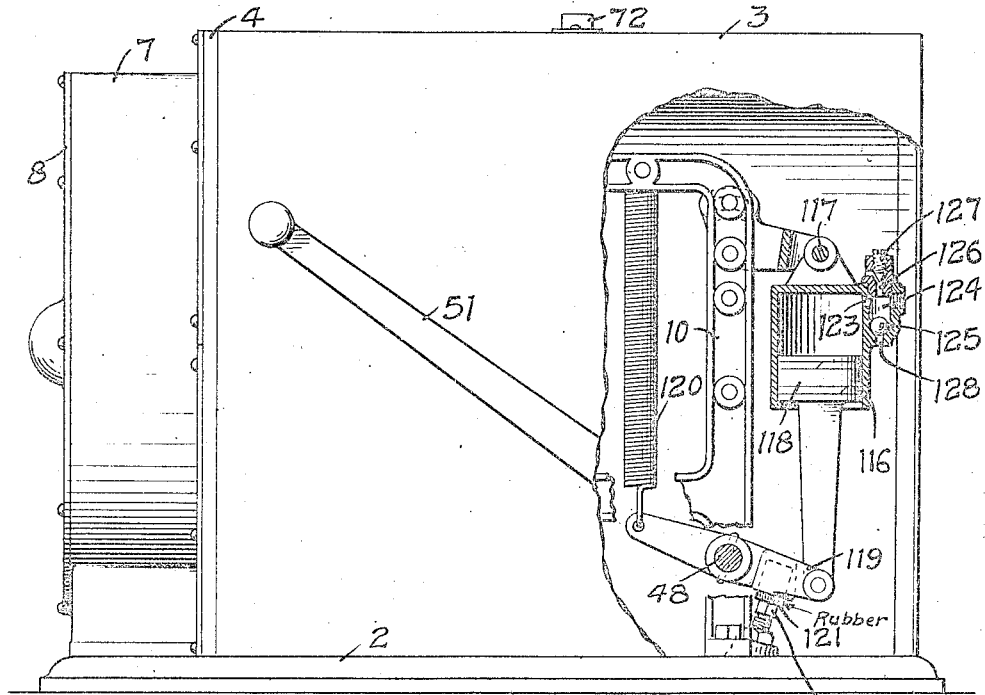
Figure 5:
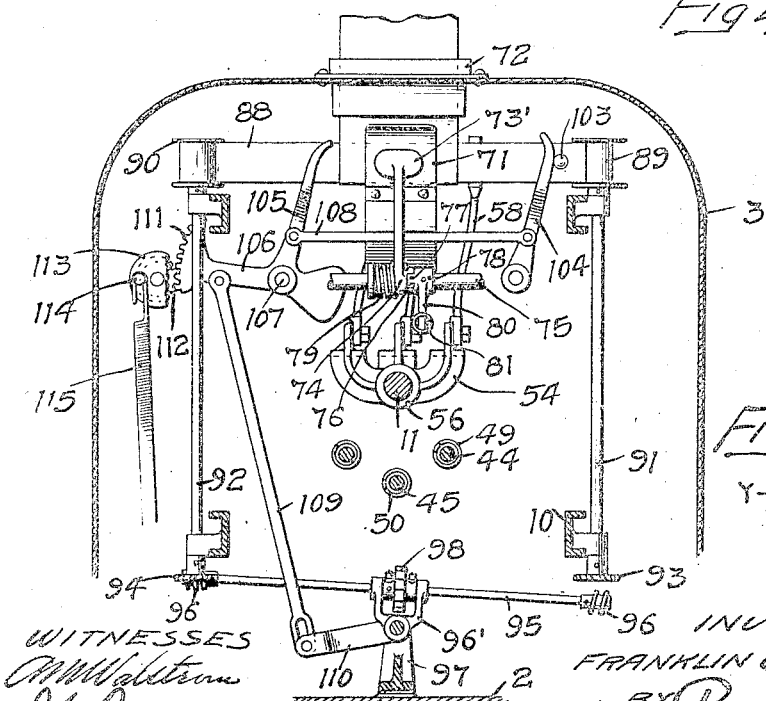

In the accompanying drawings forming part of this specification, Figure 1 is a plan view of a scale mechanism, partially in section, embodying my invention, Fig. 2 is a vertical, longitudinal, sectional view of the same, Fig. 3 is a vertical sectional view on the line $x$—$x$ of Fig. 2, Fig. 4 is a side elevation with a portion of the casing broken away, Fig. 5 is a vertical sectional view on the line $y$—$y$ of Fig. 2, Figs. 6, 7 and 8 are detail views looking at the top of the rings representing pounds and fractions thereof, Fig. 9 is a detail view of the mechanism whereon the indicator hand is supported, Fig. 10 is a detail view, partially in section, of the printing wheels, Fig. 11 is a detail view of the hammer mechanism, Fig. 12 is a detail view of the hammer trip mechanism.

In the drawing, 2 represents a suitable base whereon the scale mechanism is mounted.

3 is a casing inclosing the rear portion of the scale mechanism and 4 is a ring fitting within the open forward end of the casing 3 and provided with an annular flange 5 whereon the graduations on a scale are marked and visible through a glass ring 6, which is interposed between the ring 4 and a casting 7 that is mounted on the base 2 at the front thereof and of less diameter than the ring 4. This casting 7 is preferably circular in form and provided with a front plate 8 concealing the inner mechanism and the rear of the casting has an annular pocket or recess 9 into which the type wheel controlling rings are adapted to extend, as will hereinafter appear.

Within the casing an upright bracket 10 is provided, having bearings for a horizontal stationary shaft 11 which extends lengthwise of the machine and concentrically with respect to the casting 7 and the ring 4. The casting 7 is provided with a cross bar 12 and between this bar and the forward end of the shaft 11 a spindle 13 is arranged, having bearings at each end and carrying a loosely mounted indicator hand 14, provided with a pin 15 which contacts with a stop pin 16 mounted in said spindle. A spring 17 is coiled on said spindle and connected at one end to the hub of the indicator hand 14 and at its other end to the hub of a pinion 18, which is secured to the spindle 13. A bar 19 is vertically slidable between guide wheels 20 on the front of the casting 7 and carries a rack bar 21 which engages the teeth of the pinion 18, being held in coöperating relation therewith by a guide wheel 22. A hook 23 is attached to the lower end of the bar 19 and on this hook the packages to be weighed are hung. For convenience I have illustrated the device placed on a table or shelf 24 with the hook depending through an opening 25 therein. A cross head 26 is mounted on the bar 19 and coil springs 27 are adjustably connected thereto by means of threaded pins 28, the opposite ends of said springs being connected to a cross bar 29 mounted on the forward portion of the casting. These springs resist downward movement of the bar 19 and return the bar and pinion to their normal position when the weight is removed from the hook. The pinion 18 is provided with flanges 30 projecting beyond the edges thereof, as indicated in Fig. 9, and corresponding flanges 31 are mounted on the rack bar 21, these flanges contacting with one another as the rack bar moves up and down and holding the teeth in proper coöperation with one another, resisting any tendency of the bar to bind the teeth of the pinion. The spring 17 is designed to protect the indicator hand 14 from damage in case a package is removed from the hook 23 before the graduated rings have returned to their normal position.

For the purpose of printing a ticket to indicate in pounds and ounces the weight designated by the movement of the hand on the dial, I provide a mechanism which I will now proceed to describe in detail.

32, 33 and 34 are rings concentrically arranged and mounted respectively upon spiders 35, 36 and 37. The hubs of these spiders are slidable on the shaft 11 and the forward edges of the rings are adapted to enter the recess 9 when moved into engagement with the indicator hand. The edges of the rings are provided with notches. The ring 32 has three notches, 38, in its peripheral edge, representing the weight in tens. As the graduations of the dial indicate thirty pounds I provide three notches 38 in the edge of the disk 32, or one for each group of ten pounds on the dial. The next ring has a series of three notches, 39, each representing ten pounds and in the bottom of these notches smaller notches, 40, are formed, representing pounds, from one to nine, the longer or deeper notch indicating the ninth pound for each group. The ring 34 has a series of thirty notches 41, each representing a pound, with notches 42 indicating fractions thereof. These fractions for conveneince are in tenths, each notch 42 representing two-tenths. I do not wish in this application to be confined to the number of rings used or to the notches on each ring, as the scale is capable of a wide range of modification, according to the character of the work for which it is to be used. In some instances more than three rings may be employed and in other cases a less number and the number of notches may be varied according to the graduations on the dial to represent any required division of pounds. The spiders supporting the notched rings are held against rotation by a rod 43 and are actuated by means of rods 44, 45 and 45′, which are pivotally connected with the spiders 35 and 37 and having a sliding connection with actuating arms 46 having hubs 47 mounted on a shaft 48. Springs 49 and 50 are mounted on the rods 44 and 45 and resist the forward movement of the arms 46 to actuate the spiders. A crank 51 has a hub 52 fitting the shaft 48 and by the operation of this crank the shaft 48 may be rocked to force the spiders and the notched rings carried thereby forward toward the indicator hand. The indicator hand acts as a stop for the notched rings. If it is moved to a point opposite the graduation representing ten pounds, then it will enter the first notch 38 in the ring 32 and the printing wheel connected with this ring will thereby be actuated by the mechanism which I will now describe in detail.

Each spider 35, 36 and 37 has brackets 53, 54 and 55 projecting therefrom and provided with guides 56 slidable on the shaft 11. Each bracket has an arm 57, 58 and 59 mounted thereon, provided with a rack 60 adapted to engage pinions 61, 62 and 63 mounted respectively on hubs 64, 65 and 66 and carrying printing wheels 67, 68 and 69, these wheels having peripheral marks or graduations corresponding to the graduations on the dial and when the indicator hand is actuated by the weight of an article suspended on the hook 23 and assumes a position opposite a graduation on the dial, the forward movement of the notched rings will cause a corresponding movement of the printing wheels and set them so that the characters on their peripheries will be adjusted in position to print marks on a card or slip corresponding to those on the dial opposite the point where the indicator hand has stopped. As heretofore stated, if the hand stops opposite the mark indicating ten pounds, the tens ring will be actuated by the movement of the crank 51 to revolve the type wheel a sufficient distance so that a mark indicating ten pounds will be printed when the printing mechanism is operated. If pounds and fractions thereof are indicated on the dial, then the wheels 33 and 34 will be moved a sufficient distance to allow a corresponding movement of their type wheel and the proper adjustment thereof to print the desired characters on the card.

In front of the printing wheels I provide an arm 70 supporting a card carrier 71 into which the card or ticket is inserted through a guide 72 provided in the top of the casing 3. This card carrier is preferably of spring material and extends transversely of the faces of the printing wheels in the path of the hammer 73′. The hammer 73′ has a hub 74 loosely mounted on the shaft 75 and provided with a notch 76 to receive a lug 77 on a hub 78 that is secured on the shaft 75. The notch is of sufficient width to allow a limited movement of the hammer and permit the spring 79 to swing the hammer back out of contact with the ribbon. The hub 78 is provided with an arm 80 to which a spring 81 is connected which is put under tension when the hammer is drawn back to throw it forward to perform the printing operation. A collar 82 is secured to the shaft 75 and is provided with a shoulder 82' and a trip lever 83 has one end in position to engage said shoulder and yieldingly held by a spring 84. A bar 85 is pivotally connected with an arm 85' that is loosely mounted on the shaft 75 and carries the trip lever 83 and when said bar is drawn down the engagement of the lever 83 with the shoulder 82 will rock the shaft 75 and swing the hammer 73 back, away from the ribbon. A pin 86 is in the path of the lever 83 to contact therewith and swing the said lever out of engagement with the shoulder 82, whereupon the spring 81 will return the parts to their normal position and throw the hammer into contact with the ribbon to perform the printing operation. The lower end of the bar 85 is pivotally connected with an arm 87 on the shaft 48 and when the said arm is rocked the bar 85 will be drawn down and cause the release of the trip lever and the movement of the hammer. A ribbon 88 is mounted on the spools 89 and 90, which are carried on the upright shafts 91 and 92, journaled in suitable bearings and provided at their lower ends with worm wheels 93 and 94. A shaft 95 has worms 96 thereon, meshing alternately with the wheels 93 and 94 and a yoke 96' has bearings for the shaft 95 and is carried by a bracket 97. The shaft 95 is revolved by means of a ratchet wheel 98 mounted thereon and actuated by a dog 99 pivoted on a bar 100 that is connected with the arm 46 and has a reciprocating movement therewith. A spring 101 normally holds the dog 99 in engagement with the teeth of the ratchet. The rocking of the shaft 48 will reciprocate the bar 100 and cause the ratchet wheel to revolve and impart a corresponding movement to the shaft 95 to operate the upright shafts 91 and 92. The ribbon 88 has a button 103 in position to engage and oscillate a pivoted arm 104. A similar arm 105 is mounted on a plate 106 which is pivoted at 107. A link 108 connects the arms 104 and 105 to insure simultaneous movement thereof. The plate 106 is connected by a rod 109 with an arm 110 on the yoke 96, so that when the said arm is oscillated, the shaft 95 will be correspondingly rocked to move its worm gears alternately into engagement with the teeth of the worm wheels 93 and 94. A rack 111 is provided on the end of the plate 106 in position to engage the teeth of a pinion 112 on a disk 113. A pin 114 is provided on said disk at one side of the center thereof and a spring 115 is connected with said pin and is adapted to swing from one side of the center of said disk to the other side as said disk is revolved by the oscillating movement of the plate 106. This shifting of the disk and the movement of the plate 106 will rock the shaft 95 and swing one or the other of the worms thereon into engagement with the worm wheels and drive the shafts 91 and 92 and the ribbon in one direction or the reverse.

To prevent unnecessary shock or jar to the operating mechanism of the scale when the crank is operated, I provide a dash-pot device consisting of a cylinder 116 pivoted at 117 and having a piston 118 attached to a yoke 119 on the shaft 48. A spring 120 normally tends to hold the piston 118 in its depressed position after the operation of the printing mechanism. A block of yielding material 121 is carried by the yoke in position to strike a stop 122 and act as a buffer to check the force resulting from the sudden stopping of the crank lever.

The cylinder 116 is provided with a port 123 leading to a chamber 124 wherein a ball valve 125 is arranged. The upper part of this chamber has a port 126 controlled by a plug 127 and in the lower part of the chamber is a port 128 normally closed by the ball valve 125. During the ascent of the piston the air will flow out through the port in the top of the chamber, the size of the passage being regulated by the screw plug while the port in the bottom of the chamber will be closed by the ball. On the down stroke of the plunger the ball will rise and the air will flow freely through the port 128 into the chamber and from thence into the cylinder.

I do not wish in this application to be confined to the details of construction herein shown and described, as in many ways the construction may be modified and equivalent mechanisms employed without departing from the scope of my invention.

I claim as my invention:—

1. In a scale, an indicator hand and dial, a printing mechanism, an actuating means for said printing mechanism, said actuating means being in direct contact with the indicator hand on the dial.

2. In a scale, an indicator hand and dial, printing means, a setting mechanism in direct contact with the indicator hand on the dial, whereby said printing wheels are controlled.

3. In a scale, an indicator hand and dial, a printing mechanism, an actuating means for said printing mechanism provided with notches, said indicator hand being in the path of said actuating means, and the positive engagement of said hand with the notches of said actuating means regulating the movement of said printing wheels.

4. In a scale, an indicator hand and dial, rings having notched peripheries and movable toward and from said indicator hand, said hand entering said notches and forming a stop for said rings, a printing mechanism operatively connected to said rings, so as to be set thereby, and means for operating said printing mechanism.

5. In a scale, an indicator hand and dial, a series of rings having notched peripheries representing respectively graduations on said dial, said indicator hand being in the path of said rings and forming a stop therefor, the depth of the notches in said rings determining their degree of movement, a printing mechanism operatively connected to said rings, so as to be set thereby, and means for operating said printing mechanism.

6. In a scale, an indicator hand and dial, a series of concentric rings having notched peripheries representing graduations on the dial, said indicator hand forming a stop in the path of said rings, a printing mechanism operatively connected to said rings, so as to be set thereby, and means for operating said printing mechanism.

7. In a scale, an indicator hand and dial, a shaft, spiders mounted thereon, rings carried by said spiders, and telescoping with one another, and having notched edges to receive said indicator hand, said hand forming a stop for said rings, the depth of the notches regulating the degree of movement of said rings, means for actuating said rings, a printing mechanism operatively connected to said spiders so as to be set thereby, and operated by the ring-operating mechanism.

8. In a scale, an indicator hand and dial therefor, a shaft, rings slidably mounted on said shaft and having notched edges to receive said indicator hand, said hand forming a stop to regulate the movement of said rings, means for actuating said rings, comprising a rock shaft, a lever therefor, operative connections between said shaft and rings, a printing mechanism operatively connected to said rings, so as to be set thereby, and means operated by the rock shaft for operating said printing mechanism.

9. In a scale, an indicator hand and dial, rings having notched edges slidable toward and from said hand, said hand entering said notches and limiting the movement of said rings, a shaft, spiders slidable thereon and supporting said rings, brackets carried by said spiders and slidable on said shaft, printing wheels for each of said rings, arms mounted on said brackets and operatively connected with said wheels respectively, means for actuating said rings, and a printing hammer operatively connected with said actuating means.

10. In a scale, the combination, with an indicator hand and dial, of notched telescoping rings limited in their movement by the position of said indicator hand, means for actuating said rings, printing wheels corresponding in number to said rings and operatively connected respectively therewith, and a printing hammer connected with said ring operating means to be actuated thereby.

11. In a scale, an indicator hand and dial, a printing mechanism, a series of concentric rings having notched edges movable toward and from said hand, the position of said hand and the notches in the edges of said rings determining the degree of their movement toward said hand, and means operatively connecting said rings with said printing mechanism.

12. In a scale, an indicator hand and dial, rings having notched edges movable toward and from said hand, said rings being concentrically arranged and means preventing their rotary movement, the notches in said rings varying in depth to permit a greater degree of movement of the rings toward said hand, printing wheels connected respectively with said rings and revolved by the movement of said rings toward said hand, and an operating mechanism for said rings.

13. In a scale, the combination, with a printing wheel, of a card holder, a shaft, a hammer mounted thereon, a spring arranged to withdraw the hammer from contact with said wheel, a hub secured on said shaft and provided with an arm, a dog pivoted on said arm and adapted to engage a shoulder on said hub, means connected with said arm for rocking said hub and shaft and means for tripping said dog to release said arm, said hammer having a shoulder in the path of said hub, for the purpose specified.

14. In a scale, an indicator hand and dial, telescoping rings having notched peripheries and movable toward and from said indicator hand, said hand entering the notches and forming a stop for said rings, a printing mechanism operatively connected to racks carried on said rings so as to be set by said racks carried by the rings, and operated by the said ring-operating mechanism.

15. In a scale, an indicator hand and dial, rings having notched peripheries and movable toward and from said indicator hand, said hand entering said notches and forming a stop for said rings, a printing mechanism operatively connected to said rings, so as to be set thereby and operated by said ring-operating mechanism.

16. In a scale, an indicator hand and dial, a shaft, spiders mounted thereon, rings carried by said spiders and telescoping with one another and having notched edges to receive said indicator hand, said hand forming a stop for said rings, the depth of the notches regulating the degree of movement of said rings, a printing mechanism operatively connected to racks carried by the spiders for setting the printing mechanism, means for actuating said rings, and means operated by the ring-operating mechanism for operating the printing mechanism.

17. In a scale, an indicator hand and dial, a printing mechanism, means for actuating the printing mechanism, said indicator hand and actuating means being relatively movable into direct engagement to thereby set the printing mechanism.

18. In a scale, an indicator hand and dial, notched slidable members movable into and out of direct engagement with the indicator hand, and a printing mechanism connected with the notched members and adapted to be set thereby.

19. In a scale, an indicator hand and dial, notched members movable into and out of direct engagement with the indicator hand, and a printing mechanism connected with the notched members and adapted to be set thereby.

20. In a scale, an indicator hand and dial, a printing mechanism with means for actuating the printing mechanism to set the same, said actuating mechanism being in direct contact with the indicator hand on the dial.

In witness whereof, I have hereunto set my hand this 1st day of March 1910.

FRANKLIN CHATFIELD.

Witnesses:
L. C. CRONEN,
J. A. BYRNES.